Patented Dec. 22, 1953

2,663,628

UNITED STATES PATENT OFFICE 2,663,628

METHOD OF MAKING A LIGNIN FERTILIZER BASE

Alfred M. Thomsen, San Francisco, Calif.

No Drawing. Application June 29, 1950, Serial No. 171,225

1 Claim. (Cl. 71—25)

This application is a continuation-in-part of the subject matter disclosed in a former application bearing the title "Regenerating Alkaline Cooking Liquor," filed June 3, 1950, Serial No. 165,885.

In said application it was disclosed that it might be advantageous not to regenerate the liquor but to use it instead as a component of a fertilizer mixture provided potassium has been substituted for sodium in the cooking liquor. Mention was also made of the use of spent sulphite liquor, resulting from the conventional lime and sulphur dioxide cooking by converting the lime base to a potassium base or to an ammonia base. Manifestly, it was necessary to continue this disclosure under a separate application. The instant application is, therefore, confined to this use of the spent liquors from the pulp industry as a base for fertilizer operation.

It is well known that in continuous fertilization of the soil by means of inorganic substances, certain difficulties are encountered which are less pronounced when organic fertilizers can be used. In general this difficulty resides in the tendency of most soils to convert the soluble phosphate of the fertilizer into insoluble forms which become fixed in the soil principally in combination with calcium, iron and aluminum.

In this form the phosphate, perhaps owing to its extreme fineness of dispersion is quite amenable to the plant roots but it is impossible to get this fertilizer below "plow share" depth and, unfortunately, root systems go far deeper than that. With the exhaustion of the virgin fertility of the soil, therefore, man can but supply the needed phosphates to the upper soil layers.

To a less extent potash is likewise fixed in the soil but the nitrogenous material, be it applied in the form of ammonia or nitrate, is subject to little impairment of its utility except by those destructive agents which reside in the flora and fauna of the soil. A correlary to the above is represented by the exhaustion of humus from the soil by continued cultivation, a slow but inevitable drain for which no remedy exists today except by plowing under vegetation which thus adds to the humus of the soil.

Analytically, this humus is essentially a form of lignin so it has occurred to sundry investigators to use a separated form of lignin as a soil conditioner. Unfortunately, it is in general too expensive to use such things purely for the mechanical improvement it conveys to the soil but the same objective is achieved at no additional cost by the use of spent cooking liquors in the role of fertilizers. It goes without saying that on the assimilation of potash and/or ammonia in combination with lignin, the lignin itself remains in the soil in colloidal form and in extreme dispersion. However, apart from mentioning these facts, I shall confine myself solely to the roles played by potash, ammonia and phosphate in the combination disclosed herein.

For the purpose of carrying out my plan, the acid liquor of the sulphite cook is as desirable as the alkaline liquors and actually possesses the advantage at this moment, for, whereas pulp produced by the alkaline soda cooking process, has no waste liquor problem, it has become apparent to the conservation officials that the indiscriminate dumping of waste sulphite liquor must soon come to an end, even in the most favored spots where the ocean is the direct recipient of all such waste.

I will, therefore, give an illustration of spent sulphite liquor used in this manner. This liquor is first neutralized with lime and the calcium sulphite thus produced separated and recycled to the acid making system. That is, of course, standard practice in many cases.

The fifteen percent or so of sugars, on a dry state basis, in waste sulphite liquor is then advantageously removed by yeast culture, be this for the production of alcohol or for fodder yeast, as the case may be. Normally, I prefer the latter as only two-thirds of the sugar is fermentable while total sugar is acceptable in yeast manufacture, and the excellent protein produced by yeast culture forms another valuable adjunct to the food supply. With or without this removal of $SO_2$ and sugar, the liquor is available for the ensuing steps which consist of replacing the lime base with potash and/or ammonia. This can be done by interaction with either the sulphate or the carbonate of the alkali or both.

The sulphate is added first, using it in excess to the lime requirements of the cooking liquor and removing the calcium sulphate precipitated thereby. The carbonated form of alkali is then used to remove the soluble sulphates of calcium, still resident in said liquor, the final result being an innocuous substance easily concentrated in multiple effect evaporators and handled in plain iron equipment until concentration reaches approximately 50% of solids.

Phosphate may now be added to the liquor in any degree desired and in any soluble form without undue interaction and when the resulting composite is applied to the soil it will be found that the mechanical effect of the large percentage of organic material will inhibit at least to a very large extent the precipitation of insoluble phosphates in the soil.

I prefer, however, to use ammonium phosphate, at least to some extent, as the source of the phosphoric acid, in that way adding to the nitrogen content of the fertilizer at the same time that the phosphate is introduced. It is still more advantageous to add phosphorus in the form of ammonium hypophosphite, it being a peculiarity of hypophosphorous acid to form no insoluble salts whatsoever. When applied to the soil, therefore, the hypophosphite is not capable of precipitation with any soil constituents until it has become oxidized to the higher oxy-acids; hypophosphites of lime, iron and aluminum being freely soluble, the phosphites, as the next stage of oxidation, sparingly soluble; while the last stage of oxidation, the ortho-phosphates, are substantially insoluble.

Manifestly, the presence of the large amount of organic material formed by the spent cooking liquor inhibits this oxidation, or rather, it slows it down considerably, and the ultimate phosphate when formed is then prevented from separation by being held in colloidal suspension in the soil water. It will be obvious from the foregoing dissertation that it becomes possible in this manner to distribute phosphorus widely and deeply in the soil without encountering the difficulties previously enumerated.

Another way in which it becomes possible to introduce phosphorus in a truly organic form into this fertilizing material is to react upon the lignin with the highly reactive phosphine which is produced to a considerable extent in the manufacture of the hypophosphite. The complex lignin molecule has the power of absorbing many substances and joining them to its own structure. In this manner sulphur can be absorbed from a sulphide, nitrogen from ammonia and phosphorus from phosphine. Necessarily, such true organic combinations of phosphorus are still further removed from "fixation" in the soil than are the hypophosphites.

I will now give a preferred illustration of alkaline cooking as the source from which the organic material for the fertilizer is derived. I will take the orthodox soda cook as the pattern and then modify this to the extent needed to introduce the various modifications which are in use today.

In the simplest form, my innovation simply means to substitute caustic potash for caustic soda in the cooking liquor to obtain at once an organic form of potash which is in every way a desirable form of fertilizer and which will possess all the advantages possessed by the sulphite liquor potash combination previously referred to.

It will be obvious that ammonium phosphate or phosphite or hypophosphite can be added to this liquor and the mixture then used directly as fertilizer, obtaining thereby all the advantages already referred to under the sulphite operation. However, as all cooking liquors using caustic as the chief active ingredient always contain an excess of said caustic alkali which remains in the cooking liquor, it is possible to utilize this excess to good advantage in the manufacture of the hypophosphite. If elemental phosphorus be added to the extent to which this residual caustic alkali can utilize it, there will result, in this case, potassium hypophosphite and phosphine, the latter in turn combining with the lignin molecule as already indicated.

The caustic soda operation, per se, is rather limited in scope in the state of the art as it exists today but its modifications are extremely important being known as the Kraft or sulphate process in which the cooking is effected chiefly with caustic soda but sodium sulphide is generally present to approximately twenty to twenty-five percent of the soda.

Manifestly, a similar cooking liquor can be constituted by substituting potash for soda, only in this case, the cooking liquor is made up freshly each time as there is no recycling and hence no formation of sulphide.

It is, of course, very simple to reduce any quantity of potassium sulphate to sulphide by means of the wood waste from the pulp mill and then to add this sulphide to the caustic in order to form a cooking liquor of orthodox composition with reference to hydroxide and sulphide. The presence of this sulphur in the cooking liquor, apart from its odor, will have no effect on the fertilized field.

In fact, the presence of a sulphur addition to the lignin molecule will act still further to inhibit the oxidizing of the lower phosphorus compounds, which are soluble, into the higher and less soluble phosphorus combinations. In the extreme development of the use of sulphide there is such a thing in conventional use as the one hundred percent sulphide cook and its spent liquor could likewise be used as a fertilizer base but the mixture of caustic and sulphide is far more common.

Still another modification of caustic soda cooking is to use about the same amount of sulphite in place of sulphide. This results in a cook which gives approximately the same strength factors and bleachability as Kraft but without the unpleasant odors attendant to the latter modification. I find that the chief difficulty with the sulphite modification of caustic cooking has been the recovery of the mixture of caustic soda and sulphite from the spent cooking liquors in any recovery system now functioning and that has affected the usability of this otherwise desirable method.

Manifestly, if fresh cooking liquor is used every time and if the spent cooking liquor is used to improve our soils, then there is no need for any recovery system and hence the only objection to the use of this truly beautiful process has simultaneously been removed.

It is obvious in view of what has already been said with reference to the use of the spent sulphite cooking liquor as well as to the spent liquors from the caustic, Kraft or sulphate cook, that there can be no difficulty in introducing either ammonia or phosphate into the spent liquor from caustic-sulphite cooking, so it will not be dwelled upon here.

To sum up the foregoing, therefore, what I aim to achieve by my process are the ways and means whereby the entire waste of the pulping operation can be returned to the soil and the forests thus be made to contribute to the fertility of the field. By introducing the non-cellulose organics discarded by the pulp industry into the soil, I have added an extremely efficient humus builder. Simultaneously I have provided the vehicle for the introduction of organic forms of ammonia and potash as well as phosphorus and I have thus produced a medium which inhibits at one and the same time the deposition of orthodox phosphates in the soil and slows the oxidation of lower oxy-acid forms of phosphorus into the stable phosphate form. I thus permit both phosphorus and potassium fertilization to accompany that of nitrogen into the deeper root zones of the plant. I also show that all commercially existing forms of pulp cooking can be used as the means to achieve this desirable objective.

While having nothing to do with pulp industry, per se, another application of another industry could be made to apply although it is rather a distinction than a difference. Considerable attention is being given to saccharification of cellulose with lignin as a residue and it has been suggested that this lignin in powdered form can be restored to the soil as a humus builder. It will be self evident that if this lignin were cooked with caustic and/or sulphite a liquor somewhat similar to a spent cooking liquor from the pulping operation would be produced. Inasmuch as my proposal deals with the lignin in dissolved form as a component of fertilizer, it follows that this separated lignin could be used as well, sugar being a by-product of the operation instead of pulp. Manifestly, as the pulp could be converted into sugar, there is really no difference in this method of approach. However, as of today, the industry in which lignin functions is the pulp industry and not the saccharification of wood.

Manifestly, special cooking liquors could also be produced to obtain my results. It is obvious that potash instead of lime could be made the base of any sulphite cooking liquor and even ammonia has been similarly used in the laboratory although I am not aware of its use in actual operation.

The introduction of the so called "trace" elements as well as any specific metallic element, for which there is a deficiency, can be advantageously combined with the fertilizer base I have referred to. It is plain that if a soluble sulphate or carbonate of said metal be added to a spent sulphite cooking liquor having lime as a base, there will be formed an organic salt of the metal employed and the technique will be identically the same as the manner in which I convert the lime salts of such a sulphite liquor into a potash or ammonia base by reaction with these alkalis. A particular illustration would be the addition of iron sulphate to such a liquor in order to produce a soluble organic iron compound which will not be reprecipitated, or at best, will very slowly be precipitated by other soil constituents. I, therefore, consider such modifications within the scope of the present disclosure.

Having thus fully described my process, I claim:

The method of forming a liquid ammonia fertilizer from a spent sulphite cooking liquor containing lime which comprises; adding an ammonia compound capable of precipitating the lime and substituting ammonia in the cooking liquor, adding additional nitrogen in the form of carbonated ammonia; commingling the resultant solution with potassium hypophosphite to supply added potassium and phosphorus, to form an ultimate composite suitable for use as a fertilizer.

ALFRED M. THOMSEN.

References Cited in the file of this patent

UNITED STATES PATENTS

| Number | Name | Date |
| --- | --- | --- |
| 1,144,905 | Kern | June 29, 1915 |
| 1,546,562 | Breslauer et al. | July 21, 1925 |
| 1,710,272 | Richter | Apr. 23, 1929 |
| 1,933,445 | Murdock | Oct. 31, 1933 |
| 1,976,905 | Thordarson | Oct. 16, 1934 |
| 2,439,432 | Keenen et al. | Apr. 13, 1948 |